(12) United States Patent
Niedermeier

(10) Patent No.: US 10,197,096 B2
(45) Date of Patent: Feb. 5, 2019

(54) BALL BEARING CAGE, BALL BEARING, AND METHOD FOR PRODUCING SAME

(71) Applicant: GERBRÜDER REINFURT GMBH & CO. KG, Rimpar (DE)

(72) Inventor: Herbert Niedermeier, Poppenhausen (DE)

(73) Assignee: Gebrüder Reinfurt GmbH & Co. KG, Rimpar (DE)

(*) Notice: Subject to any disclaimer, the term of this patent is extended or adjusted under 35 U.S.C. 154(b) by 0 days.

(21) Appl. No.: 15/122,723

(22) PCT Filed: Apr. 8, 2015

(86) PCT No.: PCT/EP2015/000738
§ 371 (c)(1),
(2) Date: Aug. 31, 2016

(87) PCT Pub. No.: WO2015/188901
PCT Pub. Date: Dec. 17, 2015

(65) Prior Publication Data
US 2017/0138398 A1 May 18, 2017

(30) Foreign Application Priority Data
Jun. 12, 2014 (DE) .......................... 10 2014 008 763

(51) Int. Cl.
*F16C 33/38* (2006.01)
*F16C 33/41* (2006.01)
(Continued)

(52) U.S. Cl.
CPC ............ *F16C 33/3887* (2013.01); *B23C 3/00* (2013.01); *B23P 15/003* (2013.01); *F16C 19/06* (2013.01);
(Continued)

(58) Field of Classification Search
CPC ......... F16C 33/3837–33/3856; F16C 33/3887; F16C 19/06; F16C 19/163; F16C 2208/58;
(Continued)

(56) References Cited

U.S. PATENT DOCUMENTS 3,285,099 A * 11/1966 Parks, Jr. ................ F16C 19/50
74/640
4,473,260 A * 9/1984 Nosaka ............... F16C 33/3856
384/523
(Continued)

FOREIGN PATENT DOCUMENTS

DE 1450057 4/1969
DE 202010015674 U1 5/2011
(Continued)

*Primary Examiner* — Alan B Waits
(74) *Attorney, Agent, or Firm* — Richard M. Goldberg

(57) ABSTRACT

A ball bearing cage includes a plurality of ball pockets, wherein each ball pocket serves for receiving a ball, wherein each ball pocket (12, 22) has a width (B) in axial direction of the ball bearing cage (10, 20) and a length in circumferential direction of the ball bearing cage (10, 20), with the width (B) being slightly greater than a diameter of the ball (30), wherein the length is greater than the width (B) of the ball pocket (12,22) at least at an outer circumference ($U_A$) of the ball bearing cage (10), and the length ($L_A$) of the ball pocket (12,22) at the outer circumference ($U_A$) of the ball bearing cage (10) is greater than the length ($L_I$) of the ball pocket (12,22) at the inner circumference ($U_I$) of the ball bearing cage (10,20).

4 Claims, 11 Drawing Sheets

(51) Int. Cl.
*F16C 19/16* (2006.01)
*B23C 3/00* (2006.01)
*B23P 15/00* (2006.01)
*F16C 19/06* (2006.01)

(52) U.S. Cl.
CPC ........ *F16C 19/163* (2013.01); *F16C 33/3856* (2013.01); *F16C 33/416* (2013.01); *F16C 33/418* (2013.01); *B23C 2260/08* (2013.01); *F16C 2208/58* (2013.01); *F16C 2208/82* (2013.01); *F16C 2208/90* (2013.01); *F16C 2220/62* (2013.01); *F16C 2220/66* (2013.01); *F16C 2240/40* (2013.01); *F16C 2240/44* (2013.01); *F16C 2240/46* (2013.01)

(58) Field of Classification Search
CPC .............. F16C 2208/82; F16C 2208/90; F16C 2250/40; F16C 2250/44; F16C 2250/46; F16C 2220/62; F16C 2220/66; B23C 2260/08; B23C 3/00; B23P 15/003
See application file for complete search history.

(56) References Cited

U.S. PATENT DOCUMENTS

| | | | | |
|---|---|---|---|---|
| 5,609,527 A | * | 3/1997 | Fuerstenau | B23P 15/00 464/145 |
| 5,941,704 A | * | 8/1999 | Arai | A61C 1/181 384/523 |
| 8,313,246 B2 | * | 11/2012 | Oishi | F16C 19/26 384/548 |
| 9,587,679 B2 | * | 3/2017 | Hirata | B21D 53/10 |
| 2003/0219184 A1 | | 11/2003 | Rio | |
| 2007/0116395 A1 | * | 5/2007 | Toyoda | F16C 33/3887 384/533 |
| 2009/0148087 A1 | * | 6/2009 | Suzuki | F16C 33/3806 384/462 |

FOREIGN PATENT DOCUMENTS

| | | | |
|---|---|---|---|
| DE | 102010047962 A1 | 4/2012 | |
| EP | 0819862 A1 * | 1/1998 | ......... B23K 15/0006 |
| EP | 0819862 A1 | 1/1998 | |
| EP | 1803952 A1 | 7/2007 | |
| GB | 190911619 A * | 8/1909 | .............. F16C 19/08 |
| GB | 2107003 A | 4/1983 | |
| JP | 1-261516 A | 10/1989 | |
| JP | 9-21423 A | 1/1997 | |
| JP | 2006-9816 A | 1/2006 | |
| JP | 2011-185315 A | 9/2011 | |
| JP | 2013-137099 A | 7/2013 | |
| WO | 2010066293 A1 | 6/2010 | |

* cited by examiner

BALL BEARING CAGE, BALL BEARING, AND METHOD FOR PRODUCING SAME

BACKGROUND OF THE INVENTION

The present invention relates to a ball bearing cage, a ball bearing, and to a method of producing, or forming a ball bearing cage.

Ball bearing cages for arranging the individual balls of a ball bearing are well known in the art, and they serve for holding the balls in position at equal distances in circumferential direction of the ball bearing. With ball bearing cages of this type, a so-called ball pocket clearance is of high importance with respect to wear behaviour of the ball bearing cage. The ball pocket clearance is defined as the mobility of the ball in the ball pocket in axial and radial directions.

Due to misalignment of the bearings in a housing, or in case of tilt of bearing surfaces, balls within a set of balls may move with different speeds. As a result, leading or trailing balls tend to move away from the ball pocket position, thus applying forces on the ball bearing cage in circumferential direction. This may result in excessive wear.

DE 10 2010 047 962 A1 proposes a ball bearing cage wherein the ball pockets are in the form of elongated holes. Herein, the longest dimension of the ball pocket is provided in circumferential direction of the ball bearing cage and exceeds the diameter of the balls by about 20% to about 55%.

Because the ball bearings are formed as elongated holes in circumferential direction, a smaller number of balls can be received, such that static and dynamic load rating of the ball bearing is reduced. Since, in addition, the force applied to the contact surface of ball and cage for driving the cage is not applied in circumferential direction of the cage, the force contains a force component in radial direction of the cage which undesirably displaces the cage from the center thereof. As a result, wear of the ball bearing cage can proceed rapidly.

SUMMARY OF THE INVENTION

It is thus an object of the invention to provide a ball bearing cage having improved wear behavior and increased load capacity.

This object is solved by the features of the independent claims. Advantageous developments of the invention are specified in the dependent claims.

According to a first aspect, a ball bearing cage is provided having a plurality of ball pockets, wherein each ball pocket serves for receiving a ball,
  wherein each ball pocket has a width in axial direction of the ball bearing cage, and a length in circumferential direction of the ball bearing cage, with the width being equal to or slightly greater than a diameter of the ball such that the ball has no or little clearance in axial direction,
  wherein the length of the ball pocket is greater than the width of the ball pocket at least at an outer circumference of the ball bearing cage such that the ball has large clearance in circumferential direction of the ball bearing cage, so as to be capable of moving relative to the ball bearing cage to a certain degree, and
  the length of the ball pocket at the outer circumference of the ball bearing cage is greater than the length of the ball pocket at the inner circumference of the ball bearing cage.

Herein, the "length" of the ball pocket at the outer circumference of the ball bearing cage is either the length of the circular arc of the circle defined by the outer circumference of the ball bearing cage, or the chord of said circular arc. The same applies by analogy to the length of the ball pocket at the inner circumference. Accordingly, the length is defined as the direct connection (straight line) between the points in circumferential direction (at the inner circumference or at the outer circumference) delimiting the ball pocket, or is defined as the length of a circular arc of the outer circumference or the inner circumference, respectively, of the ball bearing cage.

As the length of the ball pocket at the inner circumference of the ball bearing cage is reduced with respect to the length of the ball pocket at the outer circumference, a greater number of ball pockets can be provided so as to receive a greater number of balls in the ball bearing cage. Thus, load capacity, or load rating, of the ball bearing can be increased.

Due to the length of the ball pocket being reduced at the inner circumference, the ball pocket wall which defines the length thereof and where the ball contacts the ball pocket has a more suitable orientation. The wall extends approximately in the direction towards the center of the ball bearing cage such that the ball drives the ball bearing cage approximately in circumferential direction. Thus, an undesired force component acting in a direction different from the circumferential direction is not generated or has only small share. Hence, a force component displacing the ball bearing cage from the center thereof is only small, or not present at all.

Even in case of wear of the contact point of the ball at the wall, the ball bearing cage is moved forward by the ball substantially in tangential direction, or circumferential direction such that the ball bearing cage is not displaced from the center of symmetry. Accordingly, wear behavior of the ball bearing cage is improved.

In a cross-section of the ball bearing cage which is parallel to the radius of the ball bearing cage in the axial center of the ball pocket, a wall delimiting the length of the ball pocket preferably extends substantially in a straight line. Thus, a driving force applied by the ball to the ball bearing cage substantially acts in circumferential direction of the ball bearing cage.

It is further preferred if the wall extends substantially radially to the center of the ball bearing cage at least at the point of contact with the ball such that the driving force applied to the wall substantially acts in circumferential direction of the ball bearing cage.

In a side view, as viewed in a direction toward the center of the ball bearing cage, the ball pocket preferably is circular at the inner circumference of the ball bearing cage. Thus, the length of the ball bearing cage is minimal at the inner circumference so as to allow for receiving a maximum number of balls in the ball bearing cage. Thus, the load rating of the ball bearing can be increased. Further, the ball pocket can be simply produced using a drilling, cutting or milling tool having a circular geometry.

Due to the wall which delimits the length of the ball pocket extending substantially in radial direction of the ball bearing cage, the advantages of a ball pocket elongated in circumferential direction can be employed while at the same time a large number of balls can be received so as to increase the load capacity of the ball bearing. In other words: The length of the ball pocket is greater at the outer circumference of the ball bearing cage than at the inner circumference of the ball bearing cage. In comparison with a ball pocket in the form of an elongated hole wherein the length of the ball pocket in circumferential direction is the same at the inner circumference and at the outer circumference of the ball bearing cage, the ball bearing cage having a ball pocket delimiting wall which extends in radial direction is capable of receiving a greater number of balls.

According to a further aspect, there is provided a ball bearing including an inner race, an outer race, a plurality of balls, and a ball bearing cage,
- wherein the ball bearing cage has a plurality of ball pockets for receiving the balls,
- wherein each ball pocket has a width in axial direction of the ball bearing cage and a length in circumferential direction of the ball bearing cage, with the width being slightly greater than a diameter of the ball such that the ball has small clearance in axial direction,
- wherein the length of the ball pocket is greater than the width of the ball pocket at least at an outer circumference of the ball bearing cage such that the ball has large clearance in circumferential direction of the ball bearing cage so as to be capable of moving to a certain extent relative to the ball bearing cage, and
- the length of the ball pocket at the outer circumference of the ball bearing cage is greater than the length of the ball pocket at the inner circumference of the ball bearing cage.

The ball bearing cage can be formed as an inner race-guided cage, or as an outer race-guided cage. Furthermore, the ball bearing cage can be formed as a massive cage or as a snap cage.

Preferably, the ball bearing cage is made of a high performance plastic or polymer, such as polyether ether ketone (PEEK), polyether ketone (PEK), polyphenylene sulfide (PPS), polyamide-imide (PAI) or polyimide (PI). Further, a cotton-fabric reinforced phenolic resin can be used.

According to a further aspect, there is provided a method of forming a ball bearing cage including the following steps:
- providing a semi-finished part having a circular or annular cross-section such as a bar or a tube,
- forming an internal bore, in the case of a semi-finished part having a circular cross section,
- forming ball pockets using a cutting, drilling or milling tool by moving said cutting, drilling or milling tool from an outer circumference of the semi-finished part toward a center of the cross-section of the semi-finished part, and
- during the step of forming the ball pockets, rotating the semi-finished part about the cross-section center thereof so as to form a ball pocket having the shape of an elongated hole.

This way, a ball pocket is obtained having the shape of an elongated hole, wherein the length of the ball pocket is greater at the outer circumference of the semi-finished part than at an inner circumference. Thus, a separate process step may be omitted which would be required if at first only a cylindrical ball pocket were formed using a drill. Drilling of the cylindrical ball pocket and elongating the ball pocket in circumferential direction can thus be performed in a single process step.

An elongated hole is obtained having a greater length at the circumference of the semi-finished part than at the inner circumference, because the ball pocket having the shape of an elongated hole is formed by rotating the semi-finished part in circumferential direction of the semi-finished part while the drilling tool penetrates the semi-finished part in radial direction. A circular hole may be obtained at the inner circumference if rotation of the semi-finished part is stopped upon penetration of the inner wall of a tubular semi-finished part.

Preferably, the semi-finished part is rotated clockwise in a first step, while the cutting, drilling or milling tool is moved from the outer circumference of the semi-finished part toward the center of the cross-section of the semi-finished part,
- subsequently, the cutting, drilling or milling tool is withdrawn from the semi-finished part, and
- then, the semi-finished part is rotated counter-clockwise in a second step, while the cutting, drilling or milling tool is moved toward the center of the cross-section of the semi-finished part from the outer circumference of the semi-finished part.

This way, two equal elongations of the elongated hole in circumferential direction are formed, i.e. the elongated hole is symmetrical with respect to a center in circumferential direction of the elongated hole.

Preferably, the method includes the step of separating an end portion from the semi-finished part by parting-off or cutting-off.

Further preferably, the method further includes slide finishing and/or deflashing prior to or after separation of the end portion from the semi-finished part.

BRIEF DESCRIPTION OF THE DRAWINGS

In the following, the invention will be explained in more detail by two embodiments which are described with reference to the accompanying drawings.

DETAILED DESCRIPTION

As shown in FIGS. 1 to 4, a ball bearing cage 10 of the first embodiment includes a plurality of ball pockets 12, each for guiding a ball 30. Herein, a dimension or a width B of the ball pocket 12 in axial direction is slightly greater than a diameter of the ball 30 so as to allow for a clearance. On the other hand, a dimension, or a length of the ball pocket 12 in circumferential direction is considerably larger than a diameter of the ball 30, at least at the outer circumference $U_A$, namely about 20% to 50% larger than the diameter of the ball 30, as in particular shown in the sectional drawing of FIG. 1.

Figure 1:
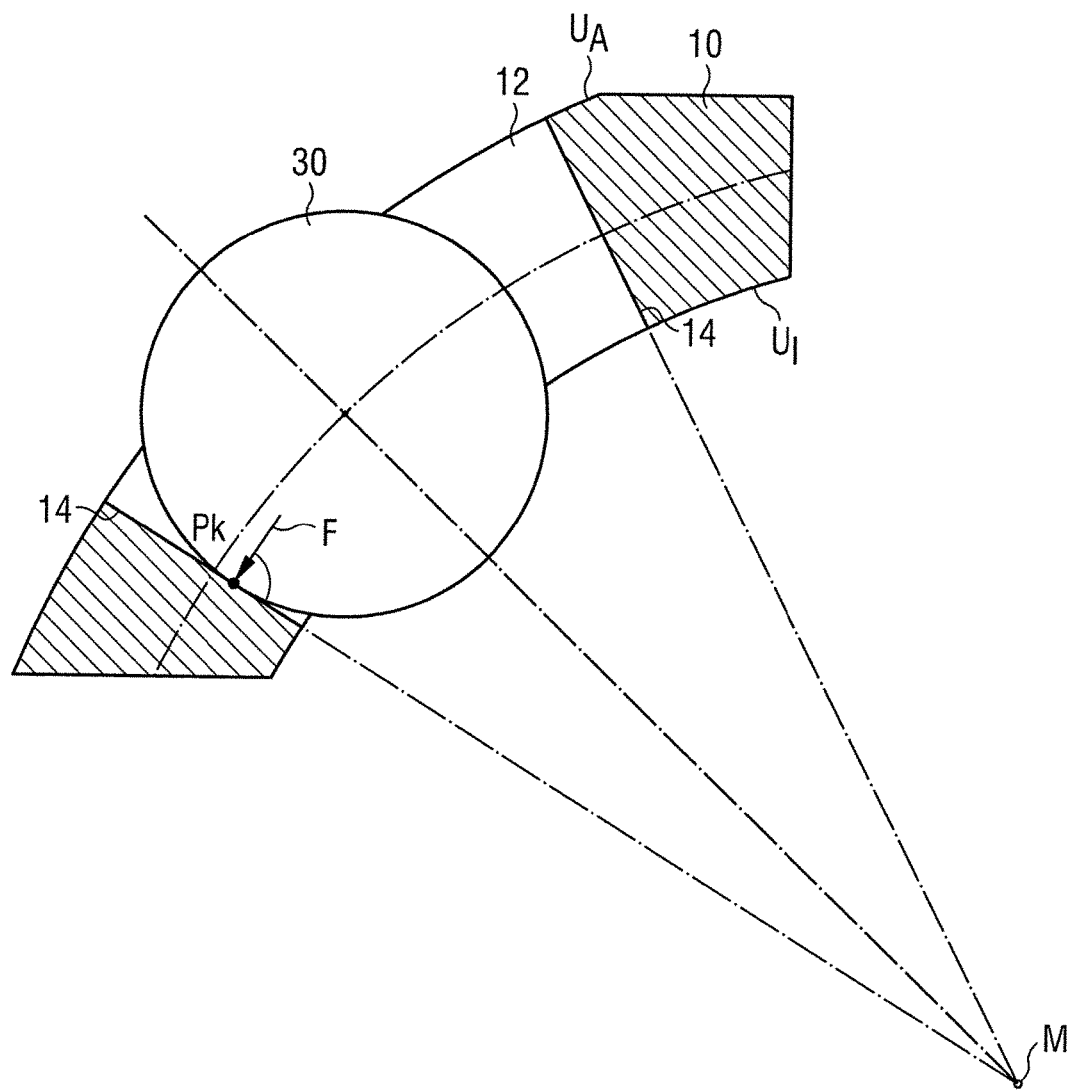
FIG. 1 is a schematic cross-section 1-1 of FIG. 4 of a detail of an inner race-guided ball bearing cage in the region of a ball pocket, according to a first embodiment.
Figure 2:
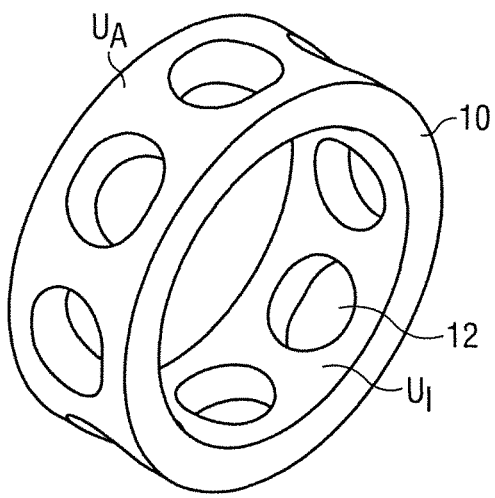
FIG. 2 is a perspective view of the inner race-guided cage of FIG. 1.
Figure 3:
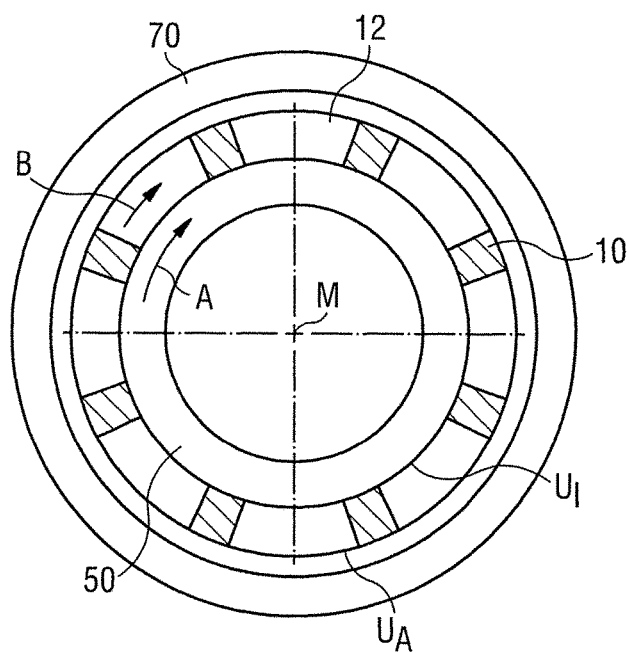
FIG. 3 is a cross-section of the ball bearing cage of FIG. 1.
Figure 4:
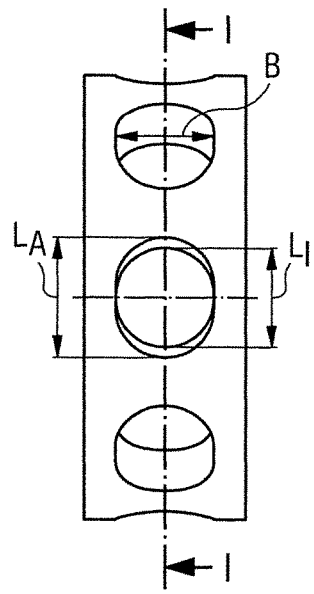
FIG. 4 is a side view of the ball bearing cage of FIG. 1.

Therein, a length $L_I$ of the ball pocket 12 at the inner circumference $U_I$ of the ball bearing cage 10 is, however, smaller than a length $L_A$ of the ball bearing cage 12 at the outer circumference $U_A$ of the ball bearing 10, as in particular shown in FIG. 4. This results in the ball pocket 12 being formed in the configuration of an elongated hole, at least at the outer circumference $U_A$. At the inner circumference $U_I$, on the contrary, the ball pocket 12 may have a circular configuration such that the length $L_I$ of the ball pocket 12 at the inner circumference of the ball bearing cage 10 is substantially equal to the width B of the ball pocket 12 in axial direction.

Although already described above, the "length" is defined either as a direct connection (straight line) between the points delimiting the ball pocket 12 in circumferential direction (either at the outer circumference $U_A$ or at the inner circumference $U_I$), or is defined as the length of a circular arc of the outer circumference, or the inner circumference, of the ball bearing cage 10.

The length $L_I$ at the inner circumference $U_I$ of the ball bearing cage 10 may, however, also be larger than the width B such that a configuration of an elongated hole is also obtained at the inner circumference $U_I$. Nevertheless, the following condition is satisfied also in this case:

$$L_A > L_I$$

The elongated hole-configuration at the inner circumference $U_I$ has a smaller length $L_I$ of the elongated hole than that of the elongated hole at the outer circumference $U_A$.

In a cross-section 1-1 (see FIG. 1) of the ball bearing cage 10 lying parallel to the radius of the ball bearing cage 10 in the axial center of the ball pocket 12, the walls 14 of the of the ball pocket 12 which delimit the length of the ball pocket 12 in circumferential direction extend toward the center M of the ball bearing cage 10 in a converging manner so as to satisfy the above condition. Preferably, the walls 14 of the ball pocket 12 extend substantially in radial direction of the ball bearing cage 10 toward the center M thereof.

With the above condition being satisfied, more balls 30 can be received as compared to a ball bearing cage with an elongated hole-configuration where $L_A = L_I$. Thereby, the load rating of the ball bearing can be improved.

Thus, in the section 1-1, the ball pocket 12 has a shape tapering in radial direction toward the center M of the ball bearing cage 10, whereas the width B of the ball pocket 12 in radial direction is substantially constant toward the center M of the ball bearing cage 10.

Moreover, the geometry of the ball pocket 12 is preferably such that the wall extends in radial direction toward the center M of the ball bearing cage 10 at least at a contact point $P_K$ with the ball 30. Thus, a force F for driving the ball bearing cage 10 is induced by the ball 30 at the wall 14 in longitudinal direction of the ball pocket 12, or in circumferential direction of the ball bearing cage 10, such that there is no force component which displaces the ball bearing cage 10 from the center M thereof.

In other words, the ball 30 applies a force F to and drives the ball bearing cage 10, said force F acting substantially in circumferential direction of the ball bearing cage 10. Therefore a rotational force applied to the ball bearing cage 10 is minimized because interfering forces in radial or other directions are not induced. It is also possible to minimize an overall friction. Wear behavior is positively affected thereby and durability of the ball bearing cage 10 as well as of a ball bearing including the same is extended.

Even if the ball pocket 12 wears or abrades at the contact point $P_K$ due to friction with the ball 30 so that a dent due to wear is formed at that point, there is no force component acting in radial direction of the ball bearing cage 10 such that excessive further wear does not occur, even when a ball pocket 12 is affected by abrasion or wear. Thus, the durability of the ball bearing cage 10, and thus of the entire ball bearing can be considerably extended thereby.

Since the length $L_I$ of the ball pocket 12 at the inner circumference $U_I$ of the ball bearing cage 10 is smaller than the length $L_A$ of the ball pocket 12 at the outer circumference $U_A$ of the ball bearing cage 10, a maximum number of balls 30 can be accommodated along the circumference of the ball bearing cage 10 so as to increase the load capacity of the ball bearing.

Figure 5:
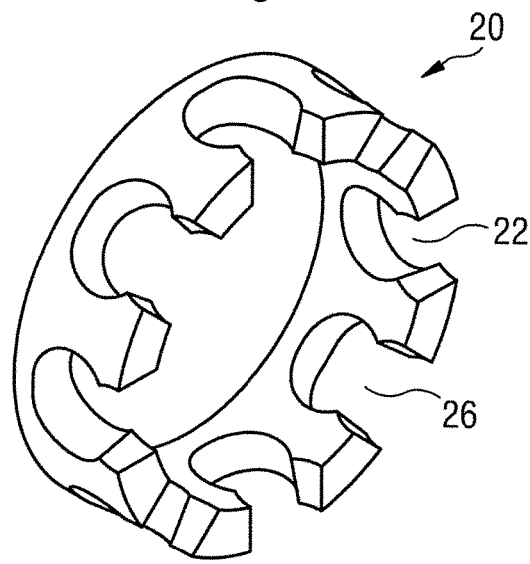
FIG. 5 is a modification of the first embodiment having an inner race-guided snap cage.
Figure 6:
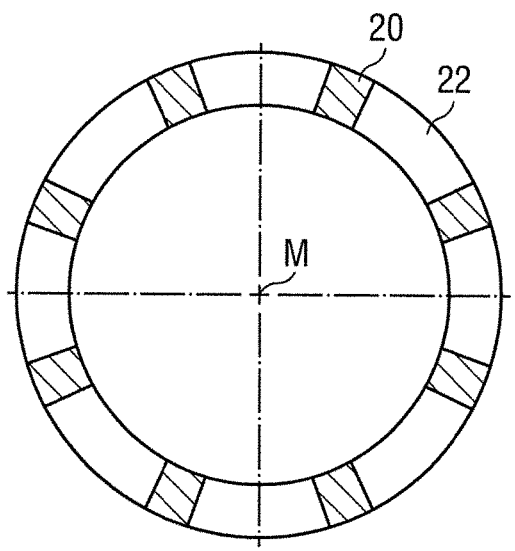
FIG. 6 is a cross section of the snap cage of FIG. 5.
Figure 7:
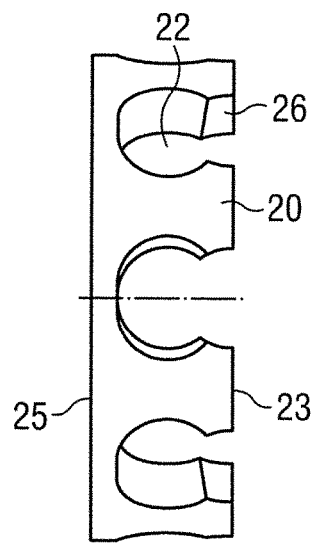
FIG. 7 is a side view of the snap cage of FIG. 5.

In FIGS. 5 to 7, a modification of the first embodiment is shown. In contrast to the ball bearing cage 10 of FIGS. 1 to 4 which is formed as a massive cage, the snap cage 20 illustrated in FIGS. 5 to 7 is provided with an opening 26 at each ball pocket 22. Therein, the openings 26 are each provided at one axial end side 23 of the snap cage 20 whereas the opposite end side 25 of the snap cage 20 is formed to be closed.

Therein, the openings 26 serve for snapping the snap cage 20 in place to the ball set consisting of the plurality of balls 30 of a ball bearing. This modification is advantageous in that the snap cage 20 of a ball bearing is exchangeable and can be mounted more easily than the ball bearing cage 10 having the massive structure. Apart from their openings 26, the ball pockets have the same geometry as the ball pockets 12 of the first embodiment.

Figure 8:
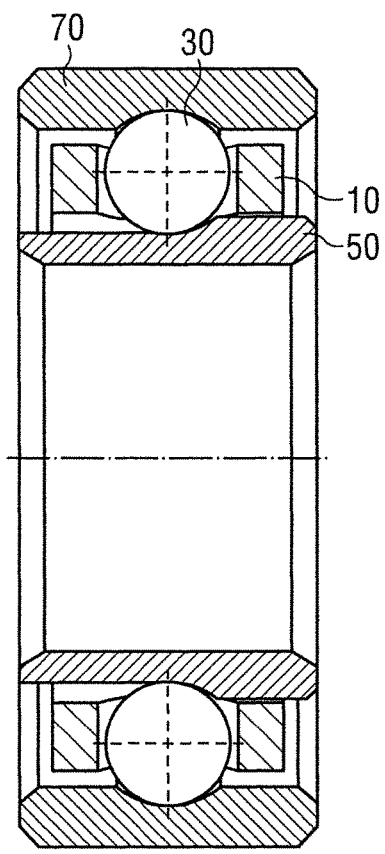
FIG. 8 is a section of an angular contact bearing including the inner race-guided ball bearing cage according to FIG. 2.
Figure 9:
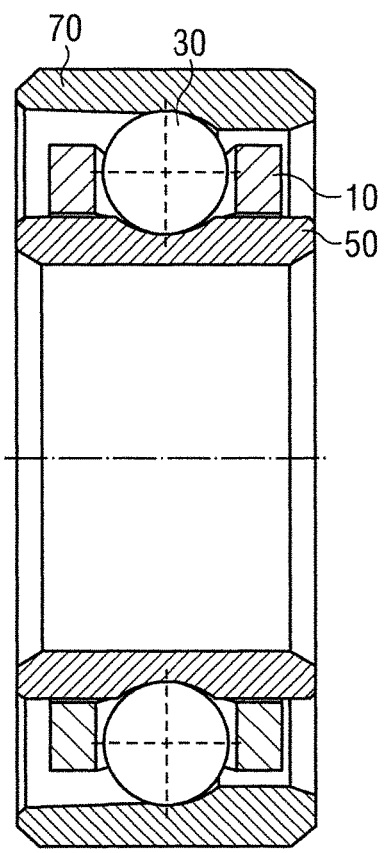
FIG. 9 is a section of a further example of an angular contact bearing including the inner race-guided ball bearing cage of FIG. 2.

FIGS. 8 and 9 show the entire ball bearing of the first embodiment having an inner race 50 and an outer race 70. The ball bearing cage 10 of FIGS. 1 to 4 is formed as an inner race-guided ball bearing cage 10, as can be seen in FIGS. 8 and 9. Therein, the inner circumference $U_I$ of the ball bearing cage 10 slides on an outer circumference of the inner race 50, as shown by the arrows A and B in FIG. 3.

Figure 10:
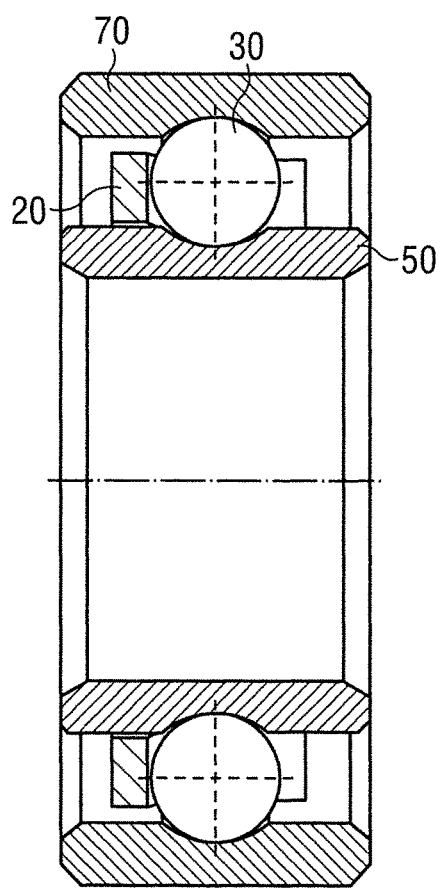
FIG. 10 is a section of a groove ball bearing including the inner race-guided snap cage of FIG. 5.
Figure 11:
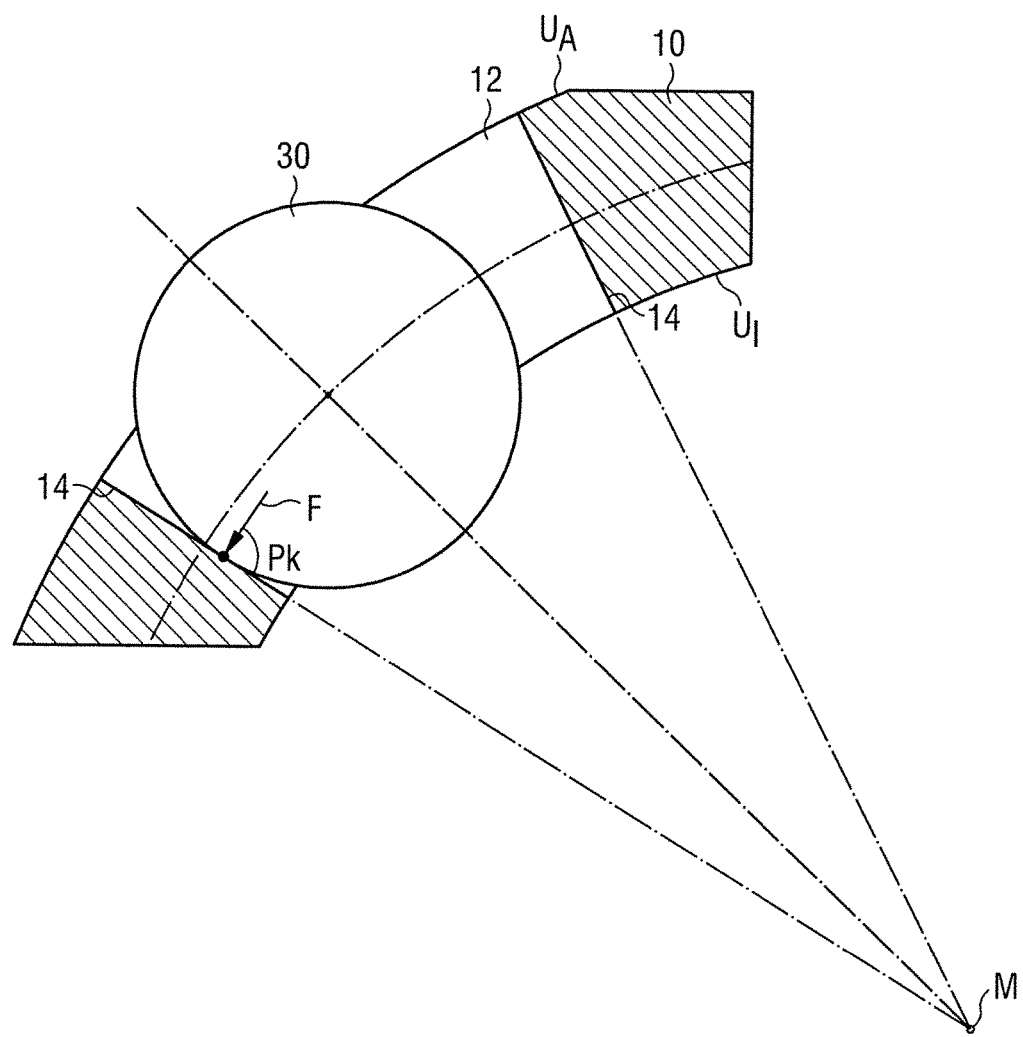
FIG. 11 is a schematic cross-section 11-11 of FIG. 14 of a detail of an outer race-guided ball bearing cage in the region of a ball pocket, according to a second embodiment.
Figure 12:
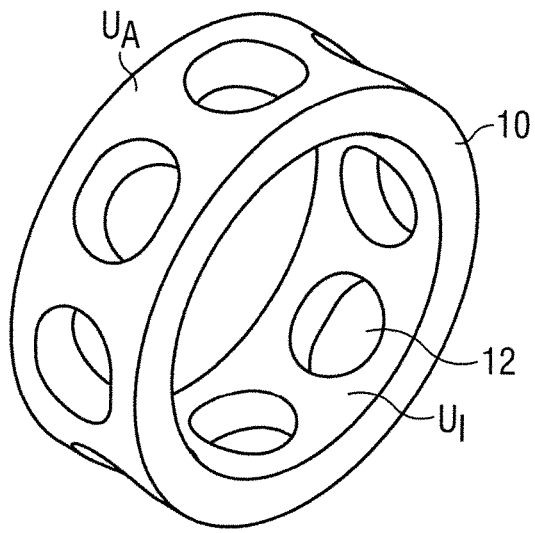
FIG. 12 is a perspective view of the outer race-guided ball bearing cage of FIG. 11.
Figure 13:
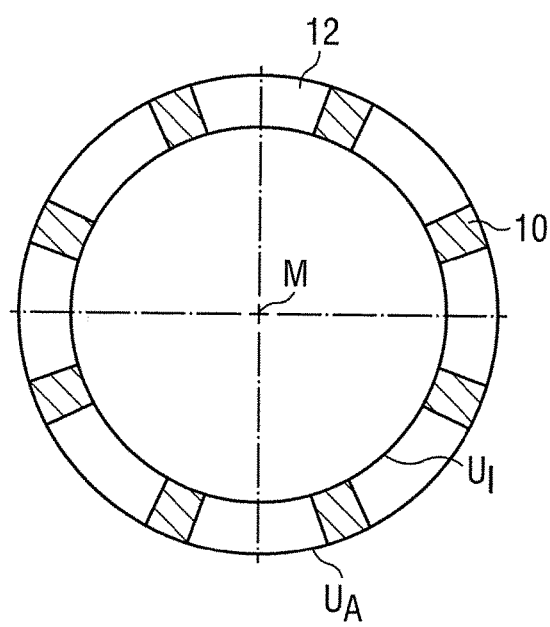
FIG. 13 is a cross-section of the ball bearing cage of FIG. 11.
Figure 14:
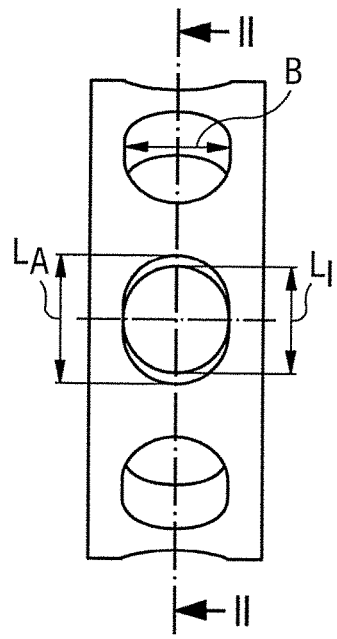
FIG. 14 is a side view of the ball bearing cage of FIG. 11.

FIG. 10 shows the entire ball bearing of the modification of the first embodiment, including the snap cage 20 which is likewise formed as an inner race-guided cage. Since the remaining components of the ball bearing 10 are equal to those of FIGS. 8 and 9, further explanation can be omitted.

Figure 18:
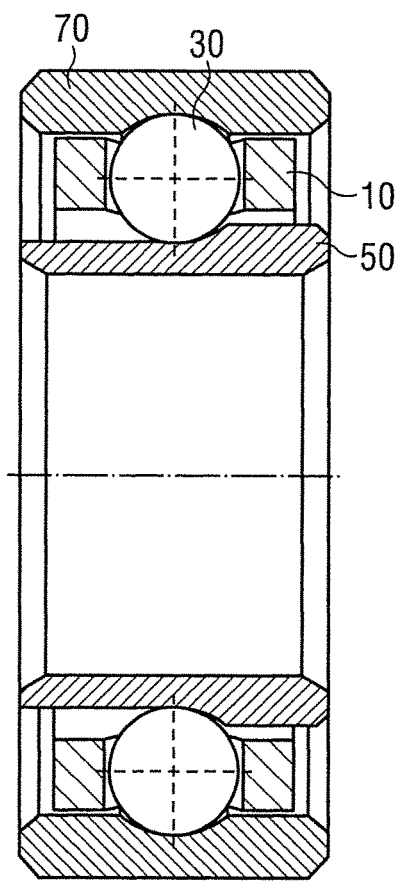
FIG. 18 is a section of an angular contact bearing including the outer race-guided ball bearing cage of FIG. 12.
Figure 19:
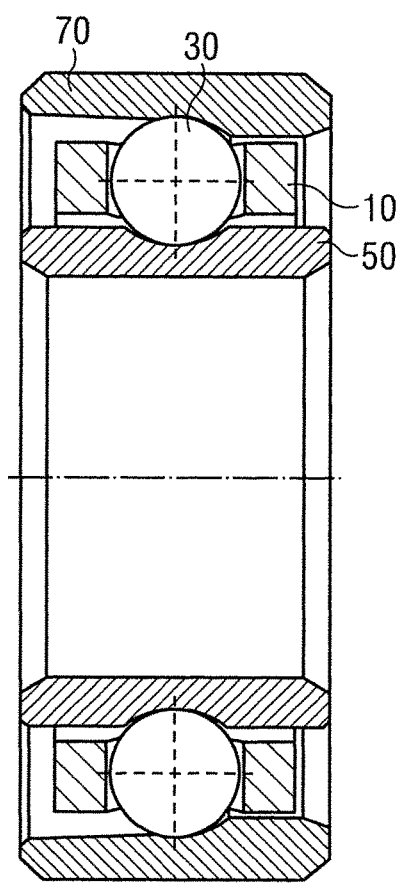
FIG. 19 is a section of a further example of the angular contact bearing including the outer race-guided ball bearing cage of FIG. 12.

FIGS. 11 to 14 show a second embodiment including an outer race-guided ball bearing cage 10 which is guided, with the outer circumference $U_A$ thereof, on an inner circumference of the outer race 70, as shown in FIGS. 18 and 19. All other features of the second embodiment according to FIGS. 11 to 14 correspond to those of the first embodiment including the massive cage of FIGS. 1 to 4.

Figure 15:
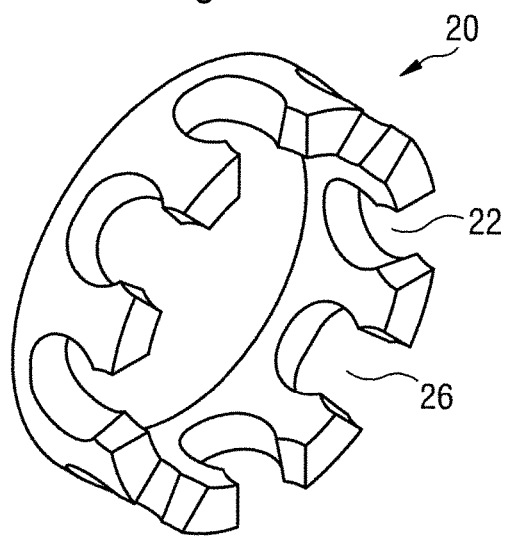
FIG. 15 is a modification of the second embodiment having an outer race-guided snap cage.
Figure 16:
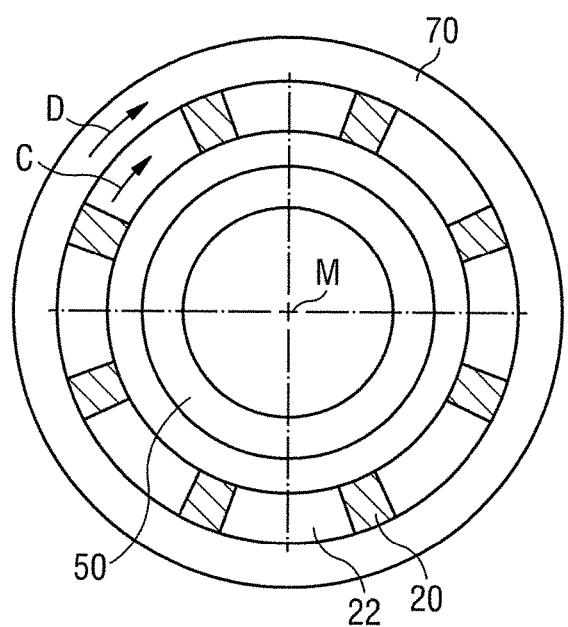
FIG. 16 is a cross section of the snap cage of FIG. 15.
Figure 17:
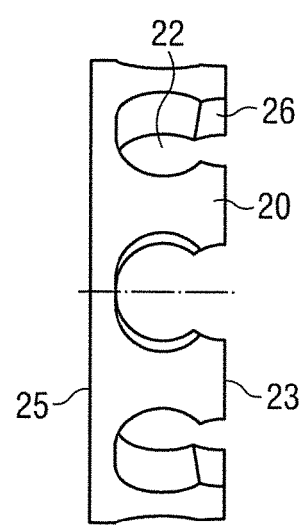
FIG. 17 is a side view of the snap cage of FIG. 15.
Figure 20:
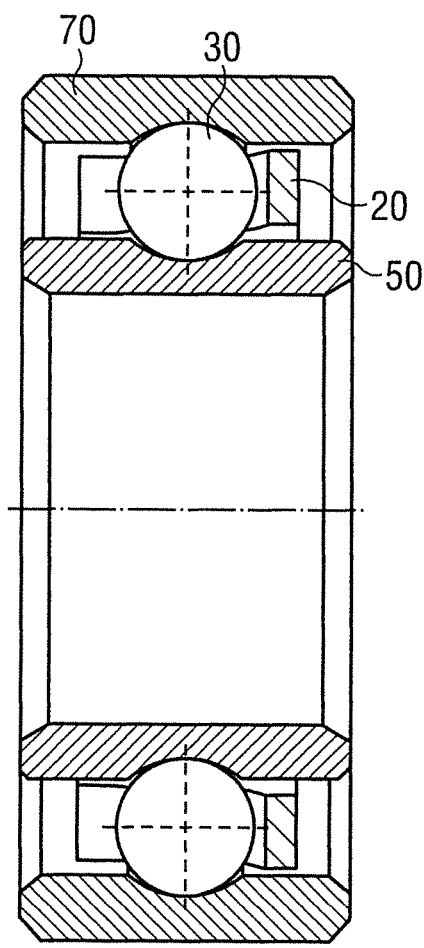
FIG. 20 is a section of a groove ball bearing including the outer race-guided snap cage of FIG. 15.

FIGS. 15 to 17 show a modification of the second embodiment including a snap cage 20 corresponding to the snap cage 20 of FIGS. 5 to 7. The snap cage 20 of FIGS. 15 to 17, however, is formed as an outer ring-guided snap cage 20, as can be taken from FIG. 20. Therein, the outer circumference $U_A$ of the snap cage 20 slides on an inner circumference of the outer race 70 of the ball bearing 50, as shown by the arrows C and D in FIG. 16.

Figure 21:
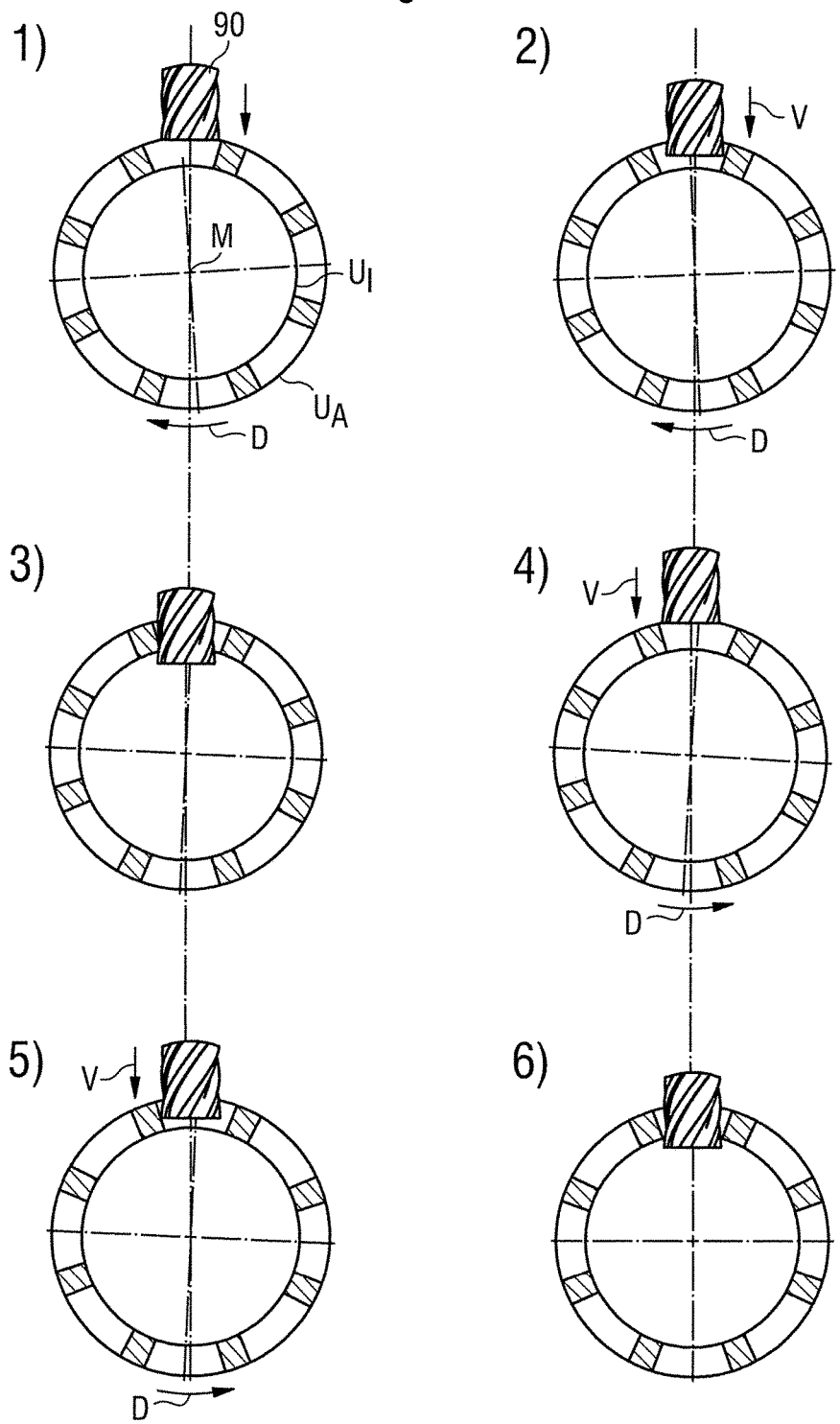
FIG. 21 shows a production method of the ball bearing cage for forming the ball pockets.

FIG. 21 shows six processing steps (1) to (6) for forming the ball pockets 12, 22 using a drilling, cutting or milling tool 90 which is movable in vertical direction along the rotational axis thereof, as indicated by the advance arrow V in FIG. 21.

A semi-finished part, formed as either a tube or a bar, is provided for forming the ball pockets 12 and 22. Preferably, a bar-shaped starting material is used which is first provided with the internal bore by drilling. Subsequently, the outer circumference is turned to obtain the desired outer diameter. Alternatively, the internal bore can be milled out.

For forming the ball pockets 12 and 22, respectively, the drilling, cutting or milling tool 90 is inserted at the outer circumference $U_A$ of the semi-finished part in a cutting or drilling manner so as to produce the ball pocket 12 or 22.

Since the ball pockets 12, 22, however, do not have a cylindrical form which would be obtained if the drilling or cutting tool 90 simply were moved toward the center M of the semi-finished part, or of the ball bearing cage 10 or the snap cage, respectively, the semi-finished part, or the ball bearing cage 10 or snap cage 20, respectively, is advanced in circumferential direction thereof during the drilling process, as indicated by the arrow D, so as to obtain the elongated shape of the ball pocket 12, 22 having the greater length $L_A$ at the outer circumference $U_A$ than at the inner circumference $U_I$. Thus, there is no need to carry out a further processing step for obtaining the above described shape of the ball pocket 12, 22 as compared to a cylindrical shape. Herein, preferably one side is processed in circumferential direction at first, by rotating the semi-finished part clockwise during the drilling process as illustrated in steps (1) and (2) of FIG. 21. At the end of the drilling process, the tool 90 breaks through at the inner circumference $U_I$ of the tube-shaped semi-finished part, as shown in step (3) of FIG. 21. Subsequently, the tool 90 is completely withdrawn from the semi-finished ball pocket 12, 22, and a second drilling process is performed for producing the second side in circumferential direction.

As illustrated in steps (4) and (5) of FIG. 21, the semi-finished part is rotated counter-clockwise during the second drilling process, as indicated by the arrow D. Thereby, the second side is formed in correspondence to the first side in circumferential direction. At the end of the drilling process, the tool 90, again, breaks through at the inner circumference $U_I$ of the tube-shaped semi-finished part, as shown in step (6) of FIG. 21.

After formation of the ball pockets 12, 22 across the circumference of the semi-finished part, the semi-finished part is cut accordingly so as to obtain the ball bearing cage 10, or the snap cage 20, respectively. The step of separating the end portion from the semi-finished part is carried out by parting-off or cutting-off. Moreover, the ball bearing cage 10, or the snap cage 20, may be processed by slide finishing and/or deflashing. This processing step may be performed prior or subsequent to separation of the end portion from the semi-finished part.

The above described ball bearing cage 10, or snap cage 20, is in particular used with high-speed applications, as for example in dental technology with a speed characteristic within the rage of about n×dm≥1,000,000 mm/min, wherein n corresponds to the speed of the inner race and dm corresponds to the average bearing diameter. The average bearing diameter dm is calculated as an average value between the outer diameter and the bore diameter of the ball bearing.

The above-described ball bearing cage 10, or snap cage 20, is preferably made of a high performance polymer, such as polyether ether ketone (PEEK), polyether ketone (PEK), polyphenylene sulfide (PPS), polyamide-imide (PAI) or polyimide (PI). Further, a cotton-fabric reinforced phenolic resin can be used.

Due to the ball pocket 12 or 22 having the configuration of an elongated hole, the typical ball pocket clearance in axial direction, i.e. perpendicular to the circumferential direction is maintained, while clearance in circumferential direction is considerably increased. Thus, the balls 30 in the ball pockets 12, 22 have more opportunities to balance the differing speeds of the balls by changing the position of the ball 30 without generating further forces acting on the ball bearing cage 10, 20 in circumferential direction.

On the other hand, a maximum number of ball pockets 12, 22 can be formed in the ball bearing cage 10, 20 when the extension $L_A$ in longitudinal direction of the elongated hole-configuration at the outer circumference $D_A$ of the ball bearing cage 10, 20 is greater than an extension $L_I$ in longitudinal direction at the inner circumference $D_I$ thereof.

It should be understood that the invention is applicable to a large variety of ball bearings, including radial deep-groove ball bearings, angular contact bearings, deep-groove ball thrust bearings, inclined ball bearings, four point bearings, and separable ball bearings. Therein, the ball bearings may be realized in the single-row or the double-row design.

The outer race 70 and the inner race 50 are, for example, made of chromium steel such as 100Cr6 (material no. 1.3505), a steel having a carbon content of about 1% and a chromium content of about 1.5%. Other steels are for example 100CrMn6 and 100CrMo6, where the alloying elements manganese (Mn) and molybdenum (Mo) provide for better hardenability.

Further, for applications in corrosive environments the high-alloy steels X65Cr13 (material no. 1.4037) and X105CrMo17 (material no. 1.4125) or X30CrMoN15-1 (material no. 1.4108) are used. The latter may be employed, at least for few days, also in the human organism. For special operational conditions, there also are the following versions:

- hybrid bearings (two materials), wherein the bearing rings or races 50, 70 are made of steel, whereas the balls 30 are made of ceramics, for example for use in spindle ball bearings for machine tools;
- ceramic bearings wherein both, the races 50, 70 and the balls 30 are made of ceramics; and
- polymer bearings having balls 30 made of glass or ceramics withstanding aggressive acids or bases in chemicals and food industry.

LIST OF REFERENCE SIGNS

10 ball bearing cage
12 ball pocket
14 wall in circumferential direction
20 snap cage
22 ball pocket
23 axial end side
25 opposite end side
26 opening
30 ball 50 inner race
70 outer race
90 cutting, drilling or milling tool
B width
D direction of rotation
F force
$L_A$ length at outer circumference
$L_I$ length at inner circumference
M center of ball bearing cage
$P_K$ contact point
$U_I$ inner circumference
$U_A$ outer circumference
V advance direction

What is claimed is:

1. A ball bearing device comprising:
    a rigid inner ring which always has a circular configuration,
    a rigid outer ring which always has a circular configuration,
    a plurality of balls,
    at least one of the inner ring and outer ring having a circumferential circular groove along which the plurality of balls move, and
    a circular ball bearing cage positioned between the inner ring and the outer ring such that the ball bearing cage slides on at least one of the inner ring and the outer ring in a circumferential direction thereof, the ball bearing cage being one of:
        an inner ring-guided cage and
        an outer ring-guided cage,
    wherein the ball bearing cage includes a plurality of ball pockets for receiving the balls,
    wherein each ball pocket has a width in an axial direction of the ball bearing cage and a length in a circumferential direction of the ball bearing cage, with the width being greater than a diameter of a said ball to be received therein,
    wherein the length is greater than the width of the ball pocket at least at an outer circumference of the ball bearing cage,
    wherein the length of the ball pocket at the outer circumference of the ball bearing cage is greater than the length of the ball pocket at an inner circumference of the ball bearing cage, and the length of the ball pocket at the inner circumference of the ball bearing cage being greater than a diameter of a ball in the ball pocket,
    wherein, in a cross-section of the ball bearing cage lying parallel to a radius of the ball bearing cage in an axial center of the ball pocket, a wall of the ball pocket delimiting the length of the ball pocket extends in a straight line, and
    wherein the wall extends only in a radial direction which always intersects a center of the ball bearing cage.

2. The ball bearing device according to claim 1, wherein the ball pocket, in a side view in a direction toward a center of the ball bearing cage, is one of a:
    circular and
    elongated hole-shaped at the inner circumference of the ball bearing cage.

3. The ball bearing device according to claim 1, wherein the ball bearing cage is made of a high performance plastic, selected from the group consisting of polyether ether ketone (PEEK), polyether ketone (PEK), polyphenylene sulfide (PPS), polyamide-imide (PAI), polyimide (PI) and a cotton-fabric reinforced phenolic resin.

4. The ball bearing device according to claim 1, wherein the ball bearing cage is formed at least as one of:
    an inner race-guided cage,
    an outer race-guided cage,
    a massive cage and
    a snap cage.

* * * * *